(12) United States Patent
Ueno (10) Patent No.: US 10,122,873 B2
(45) Date of Patent: Nov. 6, 2018

(54) ELECTRONIC DEVICE (71) Applicant: SEIKO EPSON CORPORATION, Tokyo (JP)

(72) Inventor: Kikuo Ueno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 46 days.

(21) Appl. No.: 15/415,503

(22) Filed: Jan. 25, 2017

(65) Prior Publication Data
US 2017/0223201 A1 Aug. 3, 2017

(30) Foreign Application Priority Data

Jan. 29, 2016 (JP) .................................. 2016-015322

(51) Int. Cl.
H04N 1/00 (2006.01)
G06F 3/023 (2006.01)

(52) U.S. Cl.
CPC ....... H04N 1/00387 (2013.01); G06F 3/0233 (2013.01)

(58) Field of Classification Search
CPC .......................... G06F 3/0233; H04N 1/00387
See application file for complete search history.

(56) References Cited

U.S. PATENT DOCUMENTS

| 7,656,317 B2* | 2/2010 | Salman | G06F 3/0219 341/22 |
| 2011/0246927 A1* | 10/2011 | Im | G06F 3/0236 715/773 |
| 2012/0229376 A1* | 9/2012 | Matsumoto | G06F 3/016 345/156 |
| 2016/0005150 A1* | 1/2016 | Ghassabian | G06F 3/0488 345/654 |

FOREIGN PATENT DOCUMENTS

JP 2004-145435 5/2004

* cited by examiner

Primary Examiner — Muhammad N Edun
(74) Attorney, Agent, or Firm — Workman Nydegger (57) ABSTRACT

Disclosed is an electronic device that includes a plurality of keys in which the character types of input candidate characters are switched using a toggle input method and a key control unit that changes an initial value of the character type of an input candidate character in the toggle input method to the character type of the character that is input and confirmed already when an arbitrary key among the plurality of keys is pressed.

12 Claims, 10 Drawing Sheets

| | TYPES OF CHARACTERS | SMALL LETTERS OF ALPHABET | CAPITAL LETTERS OF ALPHABET | NUMERIC NUMBERS | SYMBOLS |
|---|---|---|---|---|---|
| 501 | [1/sym] | | | 1 | VARIOUS SYMBOLS |
| 502 | [2/ABC] | abc | ABC | 2 | |
| 503 | [3/DEF] | def | DEF | 3 | |
| 504 | [4/GHI] | ghi | GHI | 4 | |
| 505 | [5/JKL] | jkl | JKL | 5 | |
| 506 | [6/MNO] | mno | MNO | 6 | |
| 507 | [7/PQRS] | pqrs | PQRS | 7 | |
| 508 | [8/TUV] | tuv | TUV | 8 | |
| 509 | [9/WXYZ] | wxyz | WXYZ | 9 | |
| 500 | [0] | | | 0 | |

| TYPES OF CHARACTERS / KEYS | SMALL LETTERS OF ALPHABET | CAPITAL LETTERS OF ALPHABET | NUMERIC NUMBERS | SYMBOLS |
|---|---|---|---|---|
| 501 — [1/sym] | | | 1 | VARIOUS SYMBOLS |
| 502 — [2/ABC] | abc | ABC | 2 | |
| 503 — [3/DEF] | def | DEF | 3 | |
| 504 — [4/GHI] | ghi | GHI | 4 | |
| 505 — [5/JKL] | jkl | JKL | 5 | |
| 506 — [6/MNO] | mno | MNO | 6 | |
| 507 — [7/PQRS] | pqrs | PQRS | 7 | |
| 508 — [8/TUV] | tuv | TUV | 8 | |
| 509 — [9/WXYZ] | wxyz | WXYZ | 9 | |
| 500 — [0] | | | 0 | |

ELECTRONIC DEVICE

The entire disclosure of Japanese Patent Application No: 2016-015322, filed Jan. 29, 2016 is expressly incorporated by reference herein in its entirety.

BACKGROUND

1. Technical Field

The present invention relates to an electronic device, and particularly relates to inputting characters to an electronic device.

2. Related Art

Recent years, a so-called toggle input method is known, in which a plurality of character types such as numeric numbers, small letters of alphabet, and capital letters of alphabet are respectively assigned to each numeric keys configuring a numeric key pad of an electronic device, and every time the same numeric key is pressed, a plurality of types of plural characters are cyclically switched. In addition, in JP-A-2004-145434, a method is disclosed, in which a plurality of characters or symbols assigned to each numeric key are designated and input using a plurality of control keys separately from the numeric key pad.

However, in the electronic device in the related art in which the toggle input method is adopted, since an initial value of switching order is always the same, for example, in a case where a user wants to enter the last character in the switching order, the number of presses of the numeric keys necessarily increases compared to a case where the first character in the switching order is input, and thus, the usability deteriorates. On the other hand, in a configuration in which a character type switching key is provided separately from the numeric key pad or in which the characters are designated by a plurality of control keys separately from the numeric key pad as disclosed in JP-A-2004-145434, the cost increases due to the increase of the number of keys in addition to the numeric key pad. In addition, despite the contribution on reducing the number of presses of the same numeric key, in the configuration in which input is performed using the keys in addition to the numeric key pad, there are problems in that the operation becomes complicated and the usability deteriorates compared to the case where the input is performed using only the numeric key pad.

SUMMARY

An advantage of the invention is to improve the usability when performing the input of characters to the electronic device.

According to an aspect of the invention, an electronic device includes: a plurality of keys to which characters of one or more character types are assigned respectively and in which the character types of input candidate characters are switched using a toggle input method; a key control unit that changes an initial value of the character type of an $n_{th}$ input candidate character in the toggle input method to the character type of the input confirmed $(n-1)_{th}$ character when an arbitrary key among the plurality of keys is pressed on the position of an $n_{th}$ character (n is an integer equal to or greater than 2); and a display control unit that displays the input confirmed character and the input candidate character on a display unit. The "initial value of the character type of an $n_{th}$ input candidate character in the toggle input method" means a character type applied when the arbitrary key is firstly pressed for inputting the $n_{th}$ character. In a case of pressing the arbitrary key for inputting the $n_{th}$ character secondly and subsequently, the character types are cyclically switched in an order from the character type applied as the initial value.

According to the invention, the initial value of the character type of the nth input candidate character follows the character type of input confirmed $(n-1)_{th}$ character. Therefore, in a case of inputting a character string of which the character type is not frequently changed, the number of presses of the keys can be reduced and thus, it is possible to improve the usability. In addition, since the keys for switching the character types are not separately needed, it is possible to reduce the cost compared to the configuration in which the keys for switching the character type are separately provided.

In addition to being considered as a device, the invention can be considered as a character input method and a computer-readable character input program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the attached drawings. In each drawing, the corresponding configuration elements will be given the same reference signs and the description thereof will be omitted.

1. First Embodiment

1-1. Configuration of Printer

Figure 1:
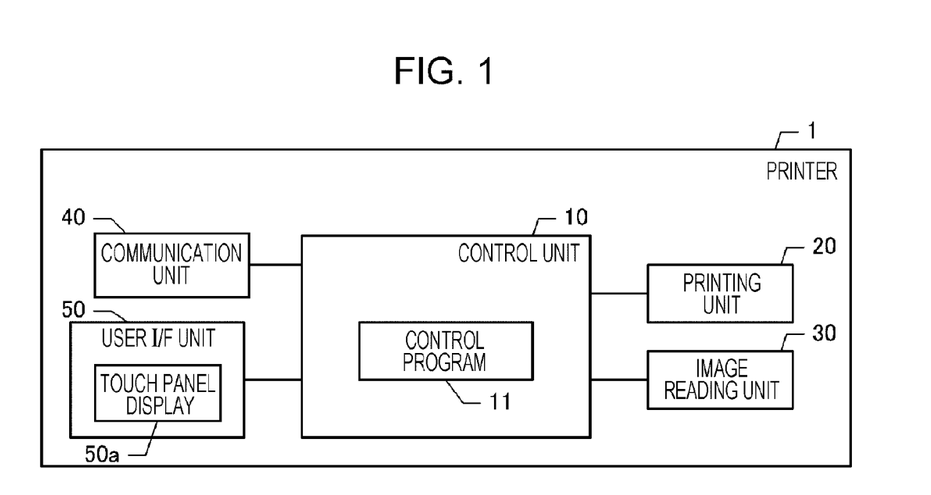
FIG. 1 is a block diagram illustrating a configuration of a printer.

FIG. 1 is a block diagram illustrating a configuration of a printer 1 as an electronic device in the invention. The printer 1 includes a control unit 10, a printing unit 20, an image reading unit 30, a communication unit 40, and a user I/F unit 50, and is configured as a printer having an image reading function.

The printing unit 20 includes an actuator, a sensor, a drive circuit, and mechanical parts for performing printing on print media such as photo paper, plain paper, an OHP sheet using a known printing method such as an ink jet method or an electro-photographic system. The image reading unit 30 includes a known color image sensor that emits light on a script placed on a script stand and divides the light reflected from the script into RGB colors and obtains scan image data, and the actuator, the drive circuit, and the mechanical parts for transporting the scripts.

The communication unit 40 includes various communication interfaces for wired or wirelessly communicating with external devices. In addition, the communication unit 40 includes an interface for communicating with various removable memories mounted on the printer 1. The user I/F unit 50 includes a touch panel display 50a (hereinafter, simply referred to as display 50a) and a key input unit (not illustrated). The display 50a as a "display unit" includes a display panel that displays various information items based on a control by the control unit 10 and a touch detection panel superimposed on the display panel, and detects a contact of a pointing object such as a human finger using a known method such as an electrostatic capacitance method, a resistive film method, an optical method, and the like. The display 50a outputs touch information (for example, coordinates of a contact start position or a contact end position) indicating the contact to the control unit 10.

The control unit 10 includes a CPU, ROM, RAM, and non-volatile memories, and the CPU can execute a control program 11 recorded in the ROM and the non-volatile memories using the RAM or the non-volatile memories. The control program 11 is a program that causes the printer 1 to realize functions of displaying various information items on the display 50a, and controlling each unit of the printer 1 to perform processing corresponding to an operation based on the touch information acquired from the display 50a when the operation (for example, tap (corresponds to pressing), swipe, pinch in, or pinch out) to the display 50a is detected. Particularly, functions of displaying the character input screen on the display 50a for performing inputting of a character to the printer 1, performing switching of the character type according to the user's character input operation on the display 50a as described below, and receiving the input character are included in the control program 11. The "key" in the present embodiment is configured as a soft key displayed on the display 50a. The control unit 10 functions as a "key control unit" and a "display control unit".

1-2. Configuration of Keys

Figure 2:
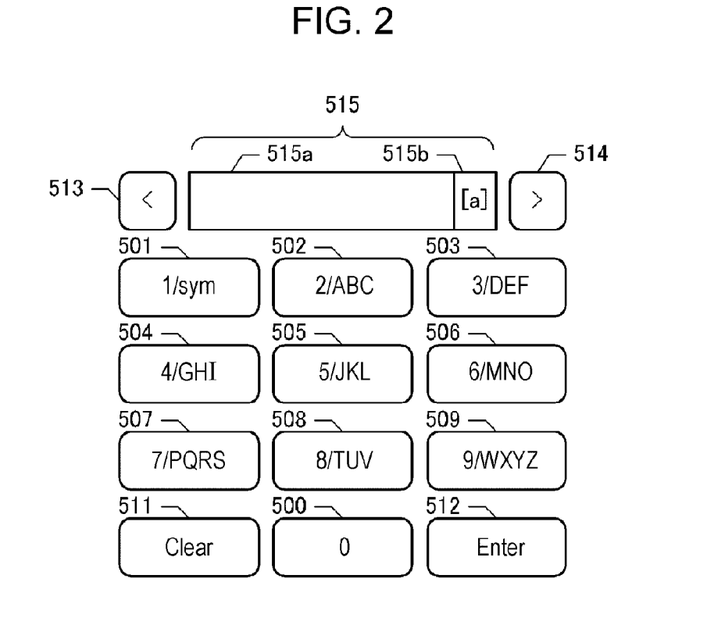
FIG. 2 is a diagram illustrating a configuration of a character input screen.

FIG. 2 illustrates the character input screen displayed on the display 50a. The keys 500 to 509 that configures the numeric key pad (a plurality of keys to which 10 kinds of numeric numbers 0 to 9 are respectively assigned), a clear key 511, an enter key 512, a left arrow key 513, a right arrow key 514, and a character input box 515 are included in the character input screen. The user can input the alphabet (capital letters and small letters), numeric numbers, and symbols to the printer 1 using the character input screen in the present embodiment.

Figure 3:
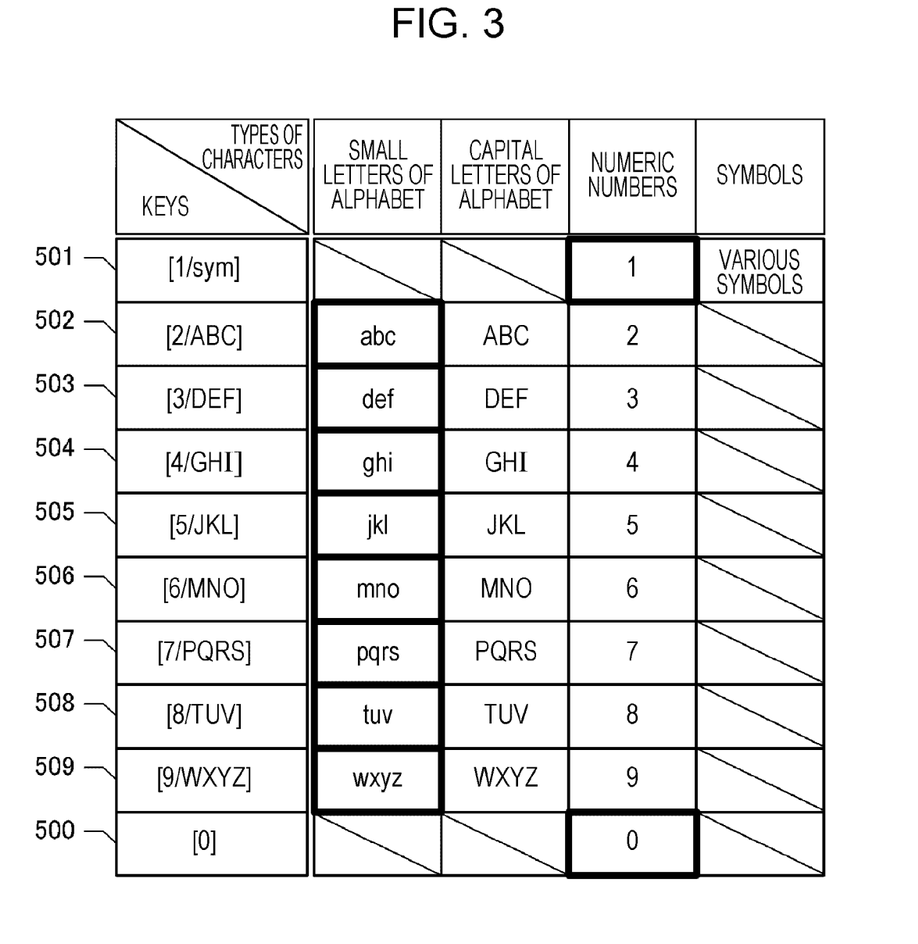
FIG. 3 is a diagram illustrating a correspondence relationship between a key and an assigned character.

FIG. 3 is a diagram illustrating a correspondence relationship between the keys 500 to 509 and the characters respectively assigned to each of the keys for each character type. The correspondence relationship is recorded in the ROM. There are four character types such as the small letters of alphabet (hereinafter, simply referred to as small letters), capital letters of alphabet (hereinafter, simply referred to as capital letters), numeric numbers, and symbols. To a [1/sym] key 501, a numeric number 1 and various symbols are assigned, and the small letters and the capital letters are not assigned. To a [2/ABC] key 502, the small letters a, b, and c, the capital letters A, B, and C, and the numeric number 2 are assigned. To a [3/DEF] key 503, the small letters d, e, and f, the capital letters D, E, and F, and the numeric number 3 are assigned. To a [4/GHI] key 504, the small letters g, h, and i, the capital letters G, H, and I, and the numeric number 4 are assigned. To a [5/JKL] key 505, the small letters j, k, and l, the capital letters J, K, and L, the numeric number 5 are assigned. To a [6/MNO] key 506, the small letters m, n, and o, the capital letters M, N, and O, and the numeric number 6 are assigned. To a [7/PQRS] key 507, the small letters p, q, r, and s, and the capital letters P, Q, R, and S, and the numeric number 7 are assigned. To a [8/TUV] key 508, the small letters t, u, and v, and the capital letters T, U, and V, and the numeric number 8 are assigned. To a [9/WXYZ] key 509, the small letters w, x, y, and z, the capital letters W, X, Y, and Z, and the numeric number 9 are assigned. The symbols are not assigned to the keys 502 to 509. To a [0] key 500, a numeric number 0 is assigned, and the small letters, the capital letters, and the symbols are not assigned.

As described above, a plurality of character types are assigned to the key 501 to key 509. In addition, a plurality of symbols (space, ".", "/", "@", and the like) which belongs to a character type of symbols are assigned to the key 501. Each time the key 501 is tapped, 1, space, ".", "/", "@", . . . , 1, space, ".", "/", input candidate characters, and character types are switched in a toggle input method. With regard to the key 502 to key 509 also, as illustrated in FIG. 3, three or four small letters of alphabet are assigned to a character type called small letter, three or four capital letters of alphabet are assigned to a character type called capital letter. In each of the keys 501 to 509, the input candidate characters and the character types are switched using the toggle input method. That is, the character types are switched to and circulates in an order of small letters, capital letters, numeric numbers, small letters and so on. In the character type of small letters and in the type of capital letters, the assigned plurality of alphabet letters are switched in an alphabetical order. In other words, the characters are switched to and circulate in an order of the assigned number of small letters of alphabet (alphabetical order), the assigned number of capital letters of alphabet (alphabetical order), the numeric numbers, the assigned number of small letters of alphabet, and so on. Specifically, for example, by pressing the key 502, input candidate characters and the character types are switched to in an order of a, b, c, A, B, C, 2, a, b, and so on. Initial default values of each type of characters for each key are the character types illustrated in thick frames in FIG. 3.

The character input box 515 includes an input portion 515a and a character type presentation portion 515b. The input portion 515a has a function of displaying the input confirmed character and the input candidate character. The character type presentation portion 515b has a function of presenting the currently applied character type. A function of erasing a character displayed on the input portion 515a is assigned to the clear key 511. For example, in a case of the present embodiment, a function of erasing one character at a position of a cursor is assigned. A function of confirming the inputting of the input candidate character is assigned to the enter key 512. In addition, a function of entering the input confirmed character string in a case where the enter key is tapped after the input candidate character is confirmed, and a line change function in which the line is changed by inserting a line change code are assigned to the enter key 512. A function of moving the position of the cursor displayed on the input portion 515a toward the left by one character is assigned to the left arrow key 513. A function of moving the position of the cursor displayed on the input portion 515a toward the right by one character is assigned to the right arrow key 514.

The space may be input by a combination of the key 500 to key 514. Specifically, for example, the space may be input by simultaneously pressing the right arrow key 514 (or the left arrow key 513) and the enter key 512 (pressing the enter key while the arrow key is in a pressed state). Of course, as described above, the space may be included in one of the symbols input by the key 501. Alternately, a space key may be provided separately from the keys 500 to 514.

1-3. Inputting Characters

Next, operations in a case where the character string "ABC" is input will be described with reference to FIGS. 4A to 4J. The character input box 515 illustrated in FIG. 4A indicates a state before the character inputting is started. The cursor is displayed on a position of a first character on the input portion 515a. The character type presentation portion 515b is a blank. When it is detected that the [2/ABC] key 502 is tapped one time, since the initial default value of the type of characters is the small letters, the control unit 10 displays a small letter "a" as an input candidate character on the position of a the first character where the cursor is positioned as indicated in the character input box 515 in FIG. 4B. Subsequently, when it is detected that the [2/ABC] key 502 is tapped three times, the control unit 10 displays the small letters "b" and "c" (not illustrated) in an order on the position of the first character where the cursor is positioned according to the taps. The type of characters is switched to the capital letters according to the third tap, a capital letter "A" is displayed on the position the first character where the cursor is positioned as indicated in the character input box 515 in FIG. 4C. The control unit 10 indicates that the type of character is switched to the capital letters in the character type presentation portion 515b by displaying "A".

Figure 4A:
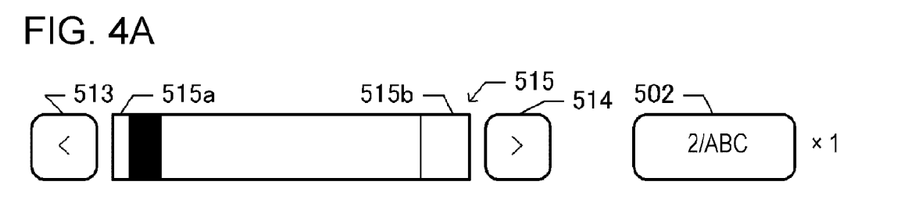
FIGS. 4A to 4J are diagrams illustrating the inputting of a character in a first embodiment.
Figure 4B:
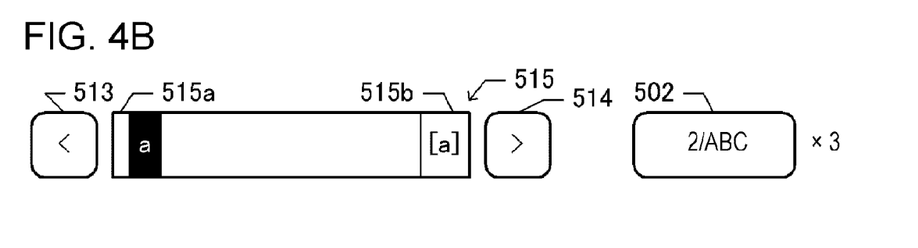
Figure 4C:
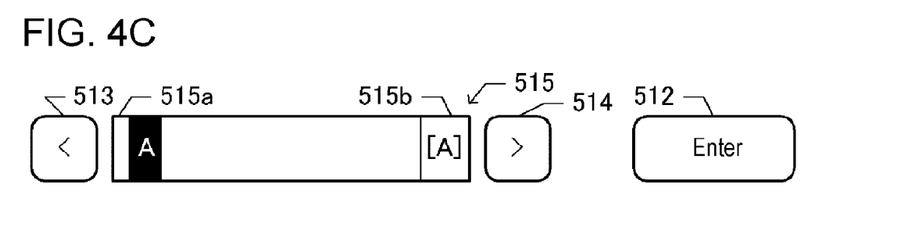
Figure 4D:
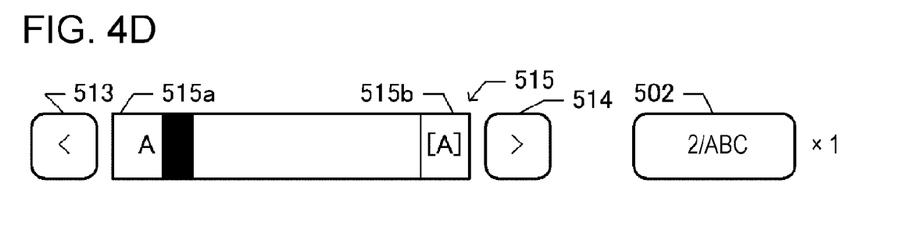

Subsequently, when it is detected that the enter key 512 is tapped, the control unit 10 confirms that the first character "A" is input and moves the cursor to the right by one character as indicated in character input box 515 in FIG. 4D, and then, waits for the inputting of the second character. In this state, the display of "A" which indicates that the currently applied type of character is the capital letters is continued to be displayed on the character type presentation portion 515b. Therefore, the display of "A" indicates that the type of characters of the input confirmed first character is succeeded, and thus, the initial value of the type of characters of the second input candidate character is the capital letters. As described above, the input candidate character and the type of character are confirmed when the enter key 512 is tapped. However, as another method, the input candidate character may also be confirmed when a key other than the key to which the input candidate character is assigned is tapped.

Figure 4E:
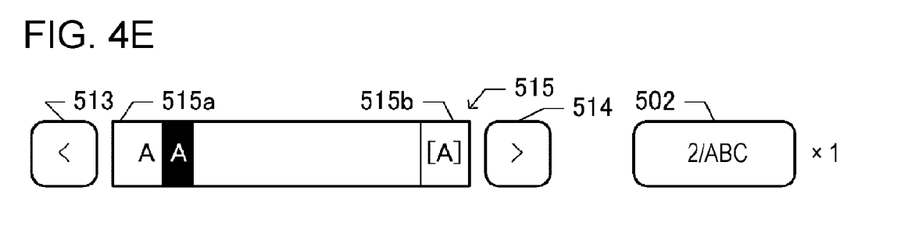
Figure 4F:
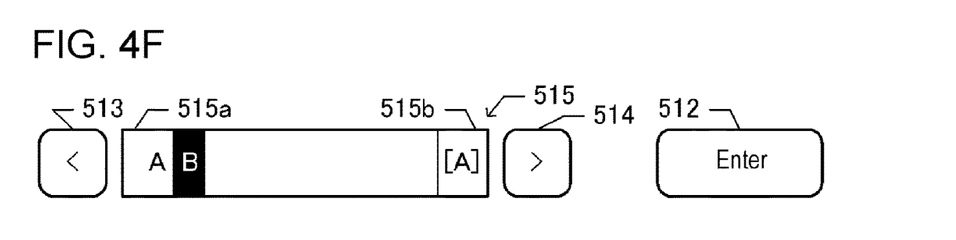

Subsequently, in a case where the character input box 515 is in a state illustrated in FIG. 4D, when the [2/ABC] key 502 is tapped one time, since the initial value of the type of characters of the second input candidate character is the capital letters, and the first character of which the type of characters is capital letter in the [2/ABC] key 502 is "A", the control unit 10 displays the input candidate "A" on the position of the second character where the cursor is positioned as indicated in the character input box 515 in FIG. 4E. Furthermore, when the [2/ABC] key 502 is tapped one time, as indicated in the character input box 515 in FIG. 4F, the control unit 10 displays "B" which is the second character in the [2/ABC] key 502 of which the character type is the capital letter on the position of the second character where the cursor is positioned. In this state, when it is detected that the enter key 512 is tapped, the control unit 10 confirms that the second character "B" is input and moves the cursor to the right by one character as indicated in character input box 515 in FIG. 4G, and then, waits for the inputting of the third character. The type of characters confirmed at the second character is succeeded, and thus, the initial value of the type of characters of the third character is the capital letters as it is.

Figure 4G:
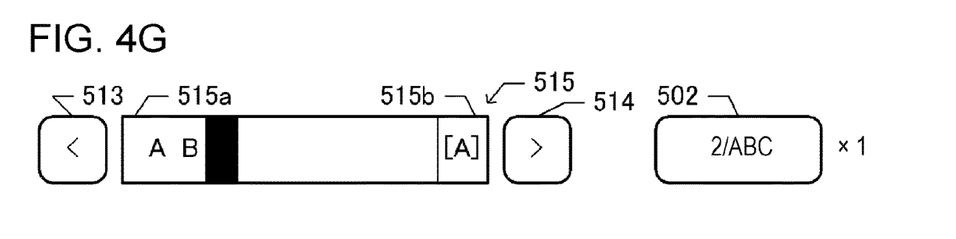
Figure 4H:
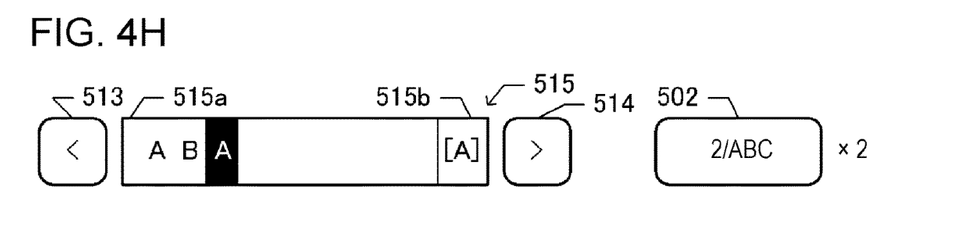
Figure 4I:
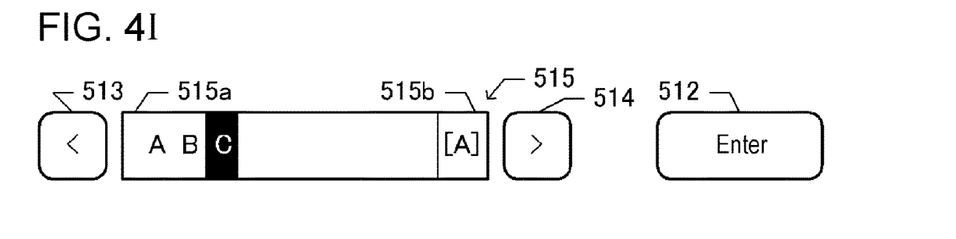
Figure 4J:
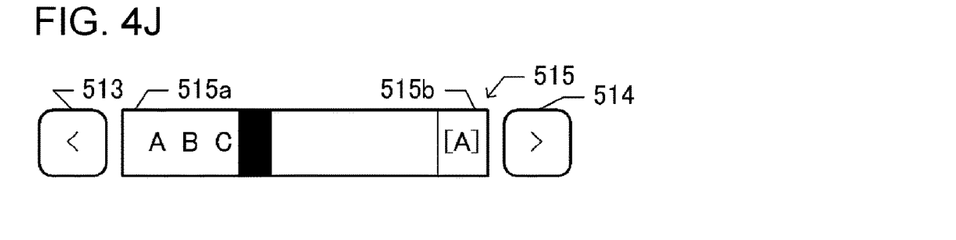

Subsequently, in the state in which the character input box 515 is as illustrated in FIG. 4G, when it is detected that the [2/ABC] key 502 is tapped one time, since the initial value of the type of characters of the third input candidate character is the capital letters, and the first character of which the type of characters is the capital letters assigned to the [2/ABC] key 502 is "A", as indicated in the character input box 515 in FIG. 4H, the control unit 10 displays the input candidate "A" on the position of the third character where the cursor is positioned as indicated in the character input box 515 in FIG. 4H. When the [2/ABC] key 502 is tapped two times continuously, the control unit 10 displays "B" (not illustrated) on the position of third character in response to the first tap and displays "C" on the position of third character in response to the second tap as indicated in the character input box 515 in FIG. 4I. Subsequently, the when the enter key 512 is tapped, the control unit 10 confirms that the third character "C" is input and moves the cursor to the right by one character as illustrated in FIG. 4J.

As described above, in a case of the present embodiment, the number of taps of the [2/ABC] key 502 for inputting the character string "ABC" is total nine. If the number of taps of the enter key 512 three is added, the character string "ABC" can be input by tapping the keys 12 times. In the present embodiment, the initial value of the type of characters of the input candidate character when inputting an $n_{th}$ character (n is an integer equal to or greater than 2) follows the type of characters of the input confirmed $(n-1)_{th}$ character, and thus, the same. However, if the configuration in the related art is adopted, in which the initial value of the type of characters of the input candidate character is always fixed to the default type of characters (the character type illustrated in the thick frame in FIG. 3), the operations required for inputting the character string "ABC" in such a case is illustrated in FIG. 5A to 5J.

Figure 5A:
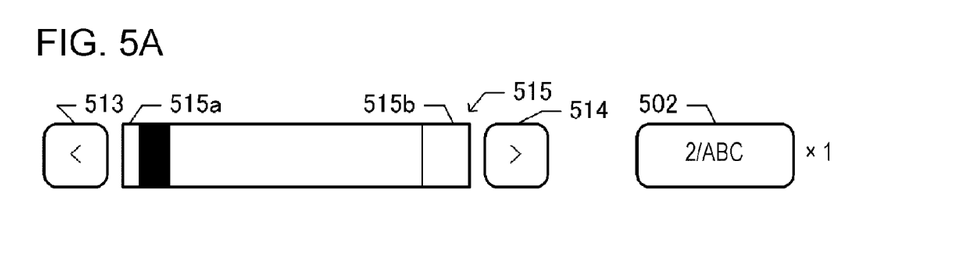
FIGS. 5A to 5J are diagram illustrating inputting of a character as comparison examples.
Figure 5B:
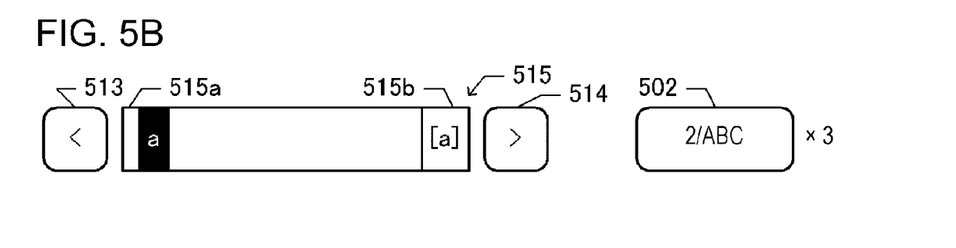
Figure 5C:
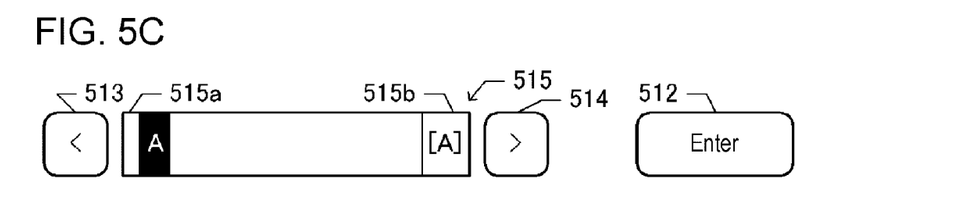
Figure 5D:
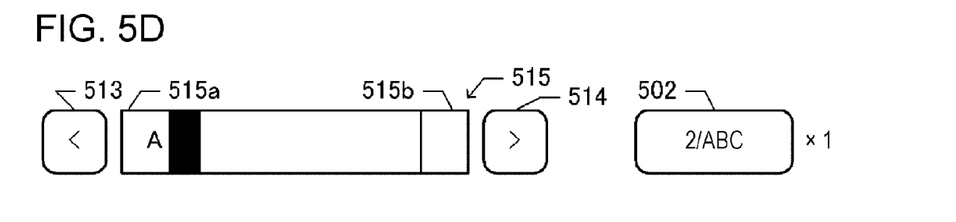

First, when the [2/ABC] key 502 is tapped in a first character input waiting state as indicated in the character input box 515 in FIG. 5A, the control unit 10 displays a small letter "a" on the position of the first character as indicated in the character input box 515 in FIG. 5B, and when the [2/ABC] key 502 is continuously tapped three times, the control unit 10 displays the "b" and "c" on the position of the first character in an order in response to the taps, and then, the control unit 10 switches the character type to the capital letters in response to the third tap and displays "A" on the position of first character as indicated in the character input box 515 in FIG. 5C. When the enter key 512 is tapped, the control unit 10 confirms the first character as "A" and moves the cursor to the right by one character as indicated in the character input box 515 in FIG. 5D, and waits for the inputting of the second character. After the first character is confirmed, the control unit 10 does not present the character type on the character type presentation portion 515b until the second character is input. The number of taps of the [2/ABC] key 502 until the first character "A" is confirmed is four which is the same as the number of operations in the first embodiment described in FIG. 4A to 4J.

Figure 5E:
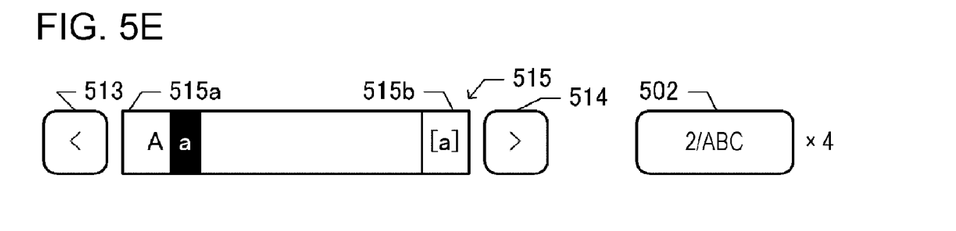
Figure 5F:
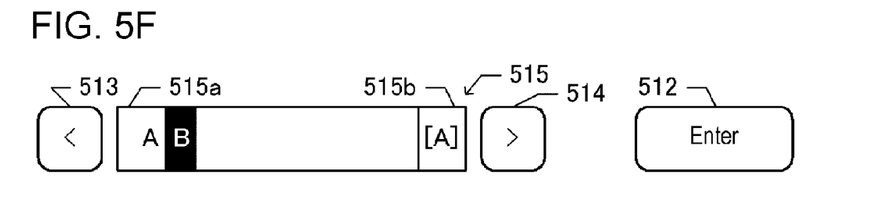
Figure 5G:
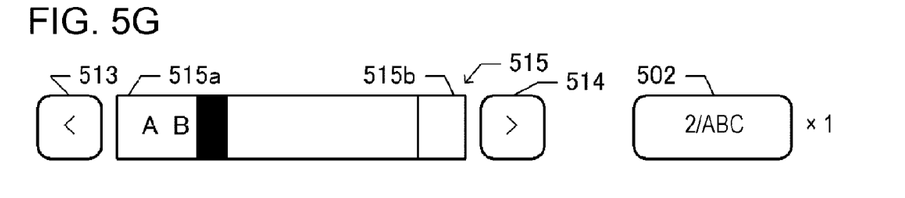

Subsequently, when the [2/ABC] key 502 is tapped one time, since the initial value of the character type of the [2/ABC] key 502 is always fixed to the small letters (the operation for switching the character type is always started from the small letters), the control unit 10 displays "a" on the position of the second character as indicated in the character input box 515 in FIG. 5E. Subsequently, when the [2/ABC] key 502 is tapped four times, the control unit 10 displays "b", "c", and "A" in the order on the position of the second character in response to the taps, and displays "B" in response to the fourth tap as indicated in the character input box 515 in FIG. 5F. Subsequently, when the enter key 512 is tapped, the control unit 10 confirms the second character as "B" and moves the cursor to the right by one character as indicated in the character input box 515 in FIG. 5G. After the first character is confirmed, the number of operations until the second character "B" is confirmed is five.

Figure 5H:
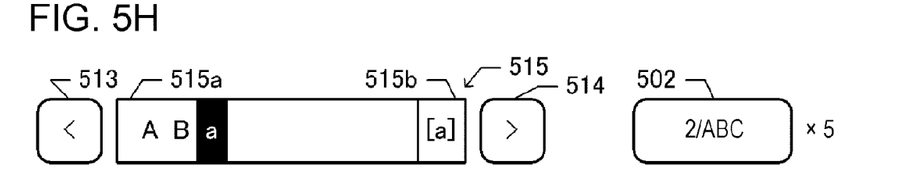
Figure 5I:
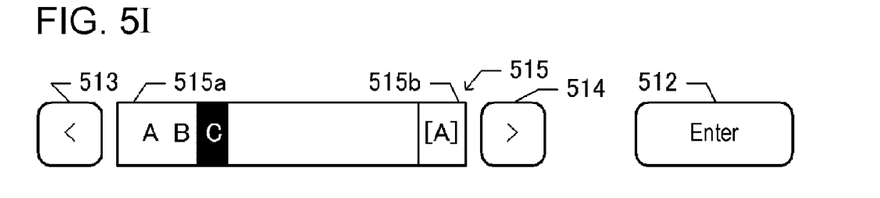
Figure 5J:
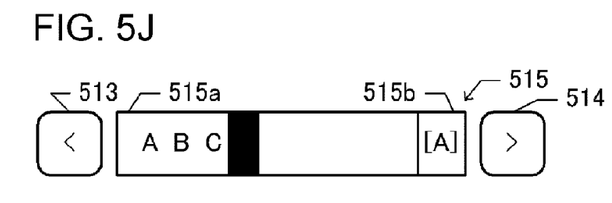

Subsequently, when the [2/ABC] key 502 is tapped one time, since the initial value of the character type of the [2/ABC] key 502 is always fixed to the small letters, the control unit 10 displays "a" on the position of the third character as indicated in the character input box 515 in FIG. 5H. Subsequently, when the [2/ABC] key 502 is tapped five times, the control unit 10 displays "b", "c", "A", and "B" in the order on the position of the second character in response to the taps, and displays "C" as indicated in the character input box 515 in FIG. 5I in response to the fifth tap. Subsequently, the enter key 512 is tapped, the control unit 10 confirms the third character as "C" and moves the cursor to the right by one character as illustrated in FIG. 5J. After the second character is confirmed, the number of operations until the third character "C" is confirmed is six.

Therefore, in a case of the configuration in which the initial value of the character type of the input candidate character is always fixed in the toggle input method, the number taps of the [2/ABC] key 502 for inputting the character string "ABC" is total 15, and if the number of taps of the enter key 512 is added, it is necessary to tap the keys 18 times. However, according to the configuration for inputting the characters in the invention described in FIG. 4A to 4J, since the initial value of the character type of the $n_{th}$ input candidate character follows the character type of the $(n-1)_{th}$ input confirmed character, it is possible to reduce the number of taps for inputting the character string "ABC" compared to the configuration in which the initial value character type is always fixed. In addition, in the case in the present embodiment, it is possible to input the alphabet (the small letters and the capital letters), the numeric numbers, and the symbols using the 12 keys such as the keys 500 to 509 corresponding to the numeric key pad, the clear key 511, and the enter key 512 without separately requiring a key for switching the character type. As a result, the area for arranging other keys such as the key for switching the character type can be used for another usage, and thus, it is possible to effectively use the display 50a.

Figure 6A:
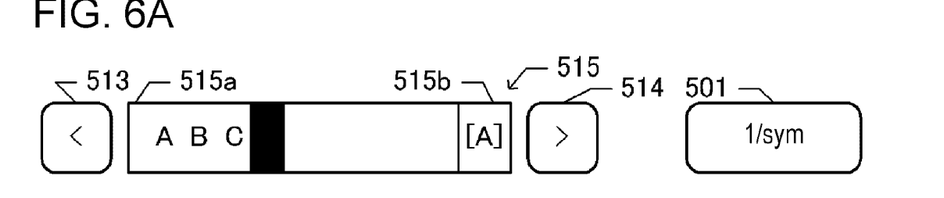
FIGS. 6A to 6B are diagrams illustrating the inputting of a character in the first embodiment.
Figure 6B:
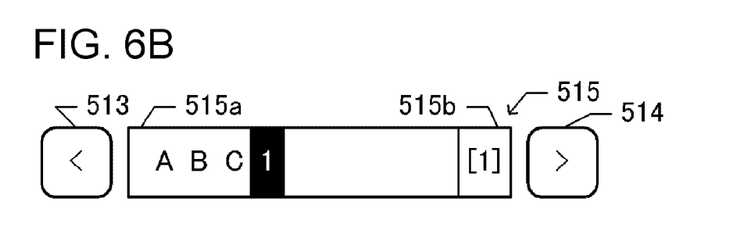

The above-described character string "ABC" is configured with the characters assigned to the same key of key 502. However, in a case of a character string configured with the characters assigned to the keys different from each other, of course similarly, the initial value of the character type of the $n_{th}$ input candidate character follows the character type of the $(n-1)_{th}$ input confirmed character (for example, in a case of inputting "ABCD", the user may simply tap the key 503 one time after the "ABC" is input described above). However, when a key to which the character type same as the character type of the $(n-1)_{th}$ input confirmed character is not assigned is tapped on the position of the $n_{th}$ character, the control unit 10 sets the initial value of the character type of the $n_{th}$ input candidate character to be a default of the character type (the character types in the thick frames in FIG. 3) determined in advance among the character types assigned to the key tapped on the position of the $n_{th}$ character. Specifically, for example, the character input box 515 in FIG. 6A indicates the state in which the initial value of the character type of the fourth input candidate character is the capital letters after the capital letters of "ABC" is finished to be input. When the [1/sym] key 501 is tapped in the state in which the character input box 515 is indicated as illustrated in FIG. 6A, since the characters of which the character type is the capital letters are not assigned to the [1/sym] key 501, the control unit 10 changes the initial value of the character type to the numeric number which is the default type of characters of the [1/sym] key 501, and displays the numeric number "1" as the fourth input candidate character as illustrated in FIG. 6B. In a case where the key to which the character type same as the character type of the $(n-1)_{th}$ input confirmed character is not assigned is tapped on the position of the $n_{th}$ character, other than the configuration in which the default character type is set, for example, a configuration may be adopted, in which the initial value of the character type is determined according to the character type of the $(n-1)_{th}$ character among the character type assigned to the key of the nth character. Specifically, for example, in a case where the [1/sym] key 501 is tapped during the inputting of the capital letters, the symbols may be the initial value.

2. Second Embodiment

In a second embodiment, after the line is changed at an $m_{th}$ line (m is an integer equal to or greater than 1), the initial value of the character type of the first input candidate character in the $(m+1)_{th}$ line is changed to the character type determined in advance. In other words, the following-on of the character type of the $n_{th}$ character to the character type of the $(n-1)_{th}$ character is reset at the time of line change (the following-on of the character type does not occur across line). Specific examples will be described with reference to FIG. 7A to FIG. 7D.

Figure 7A:
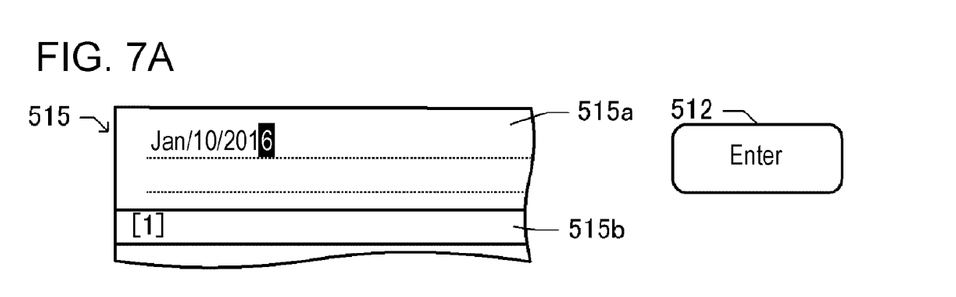
FIGS. 7A to 7D are diagrams illustrating the inputting of a character in a second embodiment.
Figure 7B:
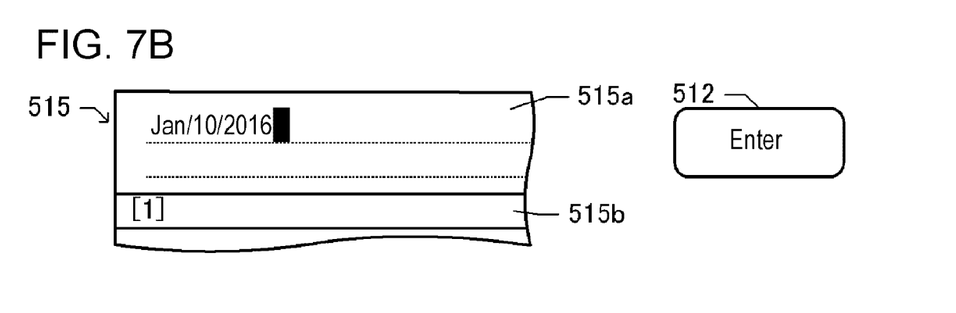

The character input box 515 in FIG. 7A indicates the state in which "Jan./10/201" is confirmed to be input in the first line, and the subsequent input candidate character is "6". When the enter key 512 is tapped in the state in which the character input box 515 is as illustrated in FIG. 7A, the control unit 10 confirms the inputting of "6", moves the cursor position to the right by one character as illustrated in the character input box 515 in FIG. 7B, and waits for the inputting of the next character. In the state in which the character input box 515 is as illustrated as FIG. 7B, the initial value of the character type of the input candidate character (a character displayed at the cursor position) next to "6" is the numeric number as it is. When the enter key 512 is tapped in the state in which the character input box 515 is as illustrated as FIG. 7A, the control unit 10 inserts a line change code to the cursor position, and displays the cursor at the head of the second line as indicated in the character input box 515 in FIG. 7C. In addition, in accordance with the line change, the control unit 10 discards the character type (numeric number) which is stored as the initial value of the character type of the next input candidate character. The control unit 10 makes the character type presentation portion 515b blank by discarding the character type.

Figure 7C:
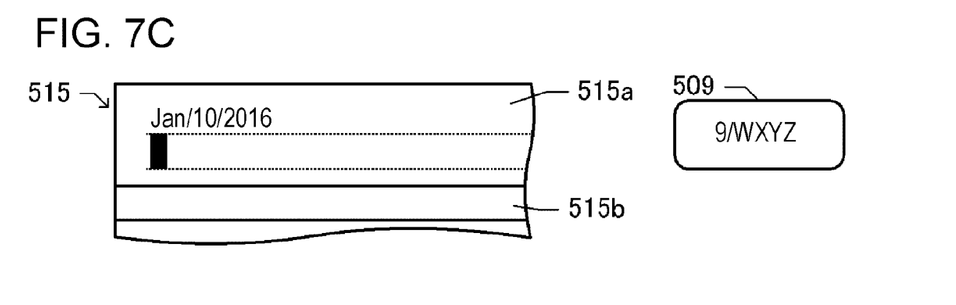
Figure 7D:
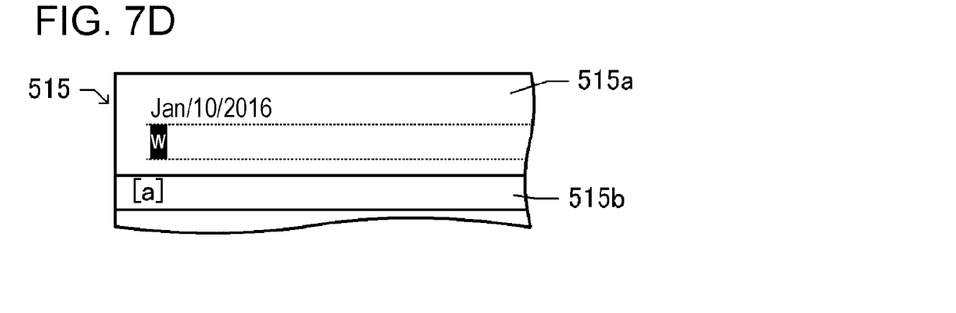

Subsequently, when the [9/WXYZ] key 509 is tapped in tapped in the state in which the character input box 515 is as illustrated as FIG. 7C, the control unit 10 sets the small letters which is the default character type of the [9/WXYZ] key 509 to the initial value of the character type of the first input candidate character in the second line. That is, as illustrated in FIG. 7D, a small letter "w" is displayed on the position of the first character in the second line. In addition, the control unit 10 display "[a]" indicating that the current currently applied character type is the small letters in the character type presentation portion 515b. As described above, since the following-on of the character type does not occur across line, the character type of the input candidate character at the head of the next line after the line change can start from the default character type.

3. Third Embodiment

In the third embodiment, after the line is changed at the $m_{th}$ line (m is an integer equal to or greater than 1), the initial value of the character type of the first input candidate character in the $(m+1)_{th}$ line is changed to the character type of the character confirmed to be input to the position of the first character in the $m_{th}$ line. In addition, in the third embodiment, the follow-on of the character type is applied from the third character of the $(m+1)_{th}$ line after the line change (n is an integer equal to or greater than 3). Specific examples will be described with reference to FIG. 8A to FIG. 8H.

Figure 8A:
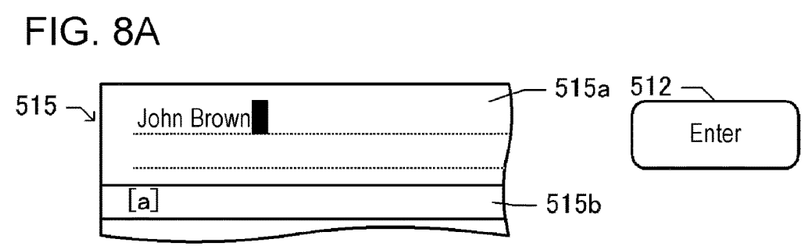
FIGS. 8A to 8H are diagrams illustrating the inputting of a character in a third embodiment.
Figure 8B:
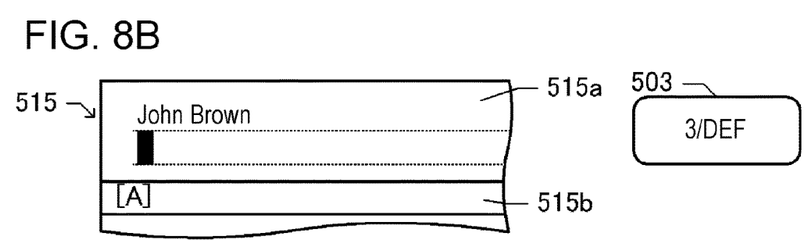
Figure 8C:
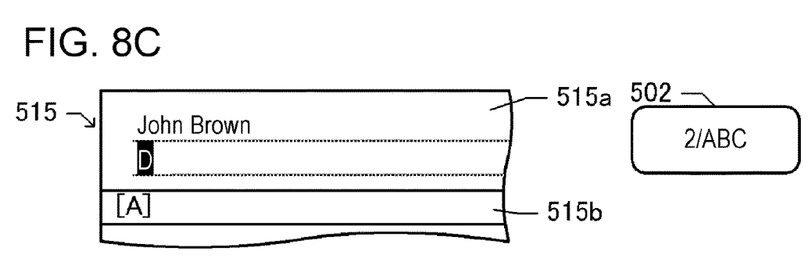

The character input box 515 in FIG. 8A indicates the state in which the character string "John Brown" is confirmed to be input in the first line, and in this state, the initial value of the character type of the next input candidate character is the small letters. In a case where the state of the character input box 515 is as illustrated in FIG. 8A, when the enter key 512 is tapped, the control unit 10 acquires the character type (originally, it is the capital letter) of the first character in the first line, and applies the acquired character type to the initial value of the character type of the first input candidate character in the second line and displays the cursor on the position of the first character in the second line as indicated in the character input box 515 in FIG. 8B. Subsequently, when the [3/DEF] key 503 is tapped, since the initial value of the character type is the capital letters, the control unit 10 display "D" on the position of the first character in the second line as indicated in character input box 515 in FIG. 8C.

Figure 8D:
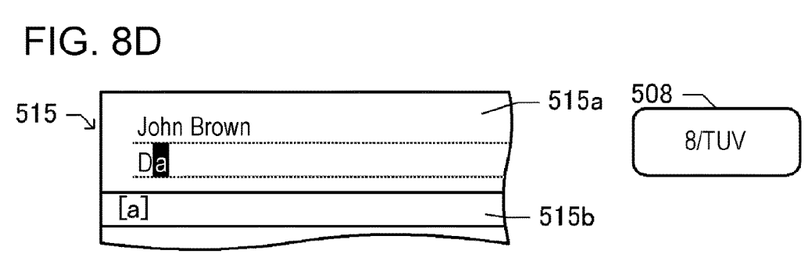
Figure 8E:
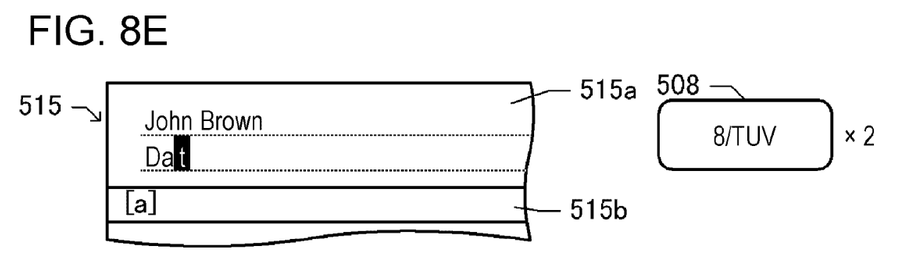
Figure 8F:
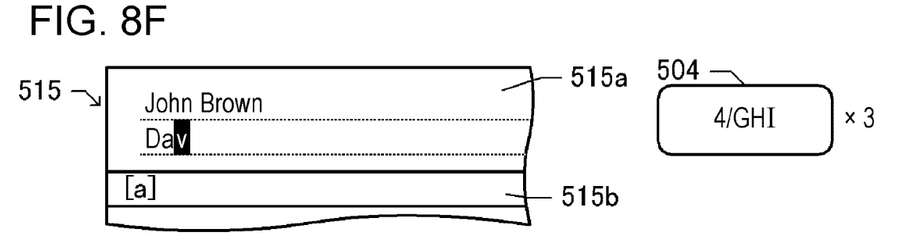
Figure 8G:
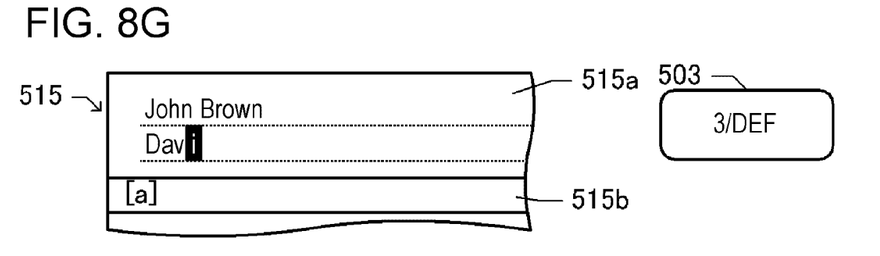
Figure 8H:
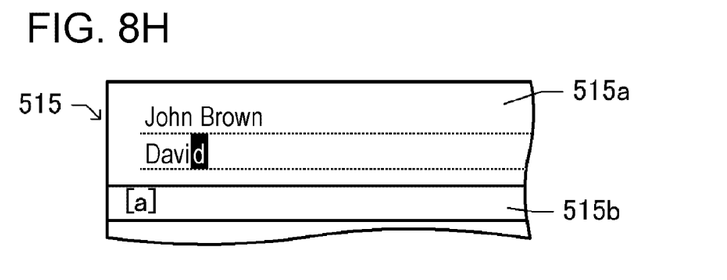

Subsequently, [2/ABC] key 502 is tapped, since the character type of the second character does not follow the character type of the first character, the control unit 10 applies the small letters which is the default character type to the initial value of the character type of the second input candidate character, and displays the small letter "a" on the position of the second character in the second line as illustrated in the character input box 515 in FIG. 8D. Subsequently, when the [8/TUV] key 508 is tapped, the character type (the small letters) of the second character in the second line is applied to the initial value of the character type of the third input candidate character, and "t" is displayed as indicated in the character input box 515 in FIG. 8E. Similarly, drawings subsequent to FIG. 8F illustrates the fact that the $n_{th}$ input candidate character is switched using the toggle operation of setting the character type of the $(n-1)_{th}$ input confirmed character to the initial value of the character type of the $n_{th}$ input candidate character.

As described above, it is possible to reduce the number of taps of the keys in a case where the character type of the head character after the line change is determined by setting the initial value of the character type of the first character in the $(m+1)_{th}$ line as the character type of the first character of the $m_{th}$ line, as described in this example. In addition, in English, since there is a tendency that the first character in a character string starts with a capital letter and the characters subsequent to the second character are the small letters, if the initial value of the character type of the second character follows the character type of the input confirmed first character, there is a possibility that the number of taps of the keys increases instead of causing the character of the character type of the second input candidate character to appear in the toggle operation. Therefore, as described in the present embodiment, it is possible to reduce the number of taps of the keys by using the configuration in which the character type of the previous character is applied to the initial value in the character subsequent to the third character in a character string.

The start point of a character string is not limited to the above-described head character after the line change. Besides the head character after the line change, of course, the initial value of the character type of the third character may follow the character type of the second character with the first character after the space (all the spaces or only the spaces next to periods) as the start point (first character). That is, the initial value of the character type of the second character may follow the character type of the first character with the first character after the space as the start point (first character) without following the character type of the first character. Furthermore, similarly to case of line change, the initial value of the first character after the space may be the same as the character type of the character after the previous space. In addition, the character type of the second character after the line change or the space may follow the character type of the second character after the previous line change or the space. As described above, when inputting a certain character, it can be expected that the number of taps of the keys is reduced by causing the character type to follow the character type of an appropriate previously input confirmed character, without being limited to the immediately previous character.

4. Other Embodiments

The technical range of the invention is not limited to the embodiments described above, and various modifications can be made without departing from the gist of the invention. For example, the "key" in the invention may be a key configured in the screen of the touch panel display as described in the embodiments, or of course, may be a key configured as a hard-key. In addition, the character input method in the invention can be applied to various electronic devices such as a personal computer, a smart phone, or a mobile tablet besides the printers.

In addition, for example, one character may be erased and the following-on of the character type may be reset by pressing the clear key. That is, in a case of firstly pressing any one of the keys 500 to 509 after the erasing, the initial value of the character type of the input candidate character may be the default character type of the key. In addition, in the embodiments described above, the symbols are not assigned to the [0] key 500. However, the symbols may be assigned to the [0] key 500.

In addition, in the embodiments described above, the input candidate character is confirmed by pressing another key or the enter key. However, the configuration may be provided in such a manner that, in order to input the $n_{th}$ character, when a predetermined time has elapsed after pressing any one of the keys 500 to 509 equal to or more than one time, the $n_{th}$ input candidate character is automatically confirmed.

In addition, in the embodiments described above, the cursor is overlappingly displayed on the input candidate character. However, the cursor may be arranged between the character and the character without overlapping the character. In addition, in the embodiments described above, a function of erasing the character overlapping the cursor is assigned to the clear key. However, in a case where the cursor is arranged between the character and the character, for example, a function of erasing a character preceding the cursor by one character may be assigned to the clear key.

In addition, the invention can also be applied to a QWERTY layout key board. In the related art, methods are known, in which, in the QWERTY layout key board for example, in a case where the alphabet, the numeric numbers, and the symbols are input in a state in which a half size alphanumeric input mode is selected, the capital letters and the small letters are switched or the numeric numbers and the symbols are switched by a method of pressing the alphabet key while pressing a shift key, or pressing the alphabet key with the Caps Lock key in ON state. However, if the invention is adopted, it is possible to input the capital letters, the small letters, the numeric numbers, and the symbols without using the shift key or the Caps Lock key. Specifically, for example, every time the [Q] key is pressed, "Q" and "q" are switched and every time the [1] key is pressed, "1" and "!" are switched.

In addition, the functions of each unit described in the claims are realized by hardware resources specified by the configuration itself, software resources of which the function are specified by a program or the combination thereof. In addition, the functions of each unit is not limited to the functions realized by the hardware resources physically independent of each other, but one hardware resource may include a plurality of functions. Alternately, a plurality of hardware resources may collaborate to realize one function.

What is claimed is:

1. An electronic device comprising:
   a plurality of keys to which characters of one or more character types are assigned respectively and in which the character types of characters available to input are switched using a toggle input method in which the characters of one or more character types available to input are switched each time a key of the plurality of keys is pressed;
   a key control unit that changes an initial value of the character type of an $n_{th}$ character available to input to the character type of the character that is previously input with the key when the key is pressed on the position of an $n_{th}$ character (n is an integer equal to or greater than 2), even if the initial value is different from an initial default value assigned to the key; and
   a display control unit that displays the input confirmed character and the character available to input on a display unit, the display control unit changing a character type presentation portion displayed on the display unit with changes to the initial value from.

2. The electronic device according to claim 1,
   wherein the key control unit changes the initial value of the character type of the $n_{th}$ character available to input in the toggle input method to the character type of the input confirmed $(n-1)_{th}$ character.

3. The electronic device according to claim 2,
   wherein n is an integer equal to or greater than 3.

4. The electronic device according to claim 1,
   wherein, when the key to which the character type is the same as that of the character that is input and confirmed already is not assigned is pressed on the position of the $n_{th}$ character, the key control unit changes the initial value of the character type of the $n_{th}$ character available to input to a predetermined character type among the character types assigned to the key which is pressed on the position of the $n_{th}$ character.

5. The electronic device according to claim 1, further comprising:
   an enter key; and
   a clear key in addition to the plurality of keys to which ten types of numeric numbers 0 to 9 are assigned respectively.

6. The electronic device according to claim 5,
   wherein the key control unit confirms the input of the $n_{th}$ character available to input and the character type by pressing a key different from the key pressed on the position of the $n_{th}$ character among the plurality of keys or by pressing the enter key.

7. The electronic device according to claim 1,
   wherein a plurality of characters per one character type are assigned to the key or another key of the plurality of keys, and
   wherein the character available to input and the character type are switched using the toggle input method.

8. The electronic device according to claim 1, further comprising a character input box through which the characters are input,
   wherein, after changing the $m_{th}$ line in the character input box (m is an integer equal to greater than 1), the key control unit changes the initial value of the character type of the first character available to input in the $(m+1)_{th}$ line in the character input box to a predetermined character type.

9. The electronic device according to claim 1, further comprising a character input box through which the characters are input
   wherein, after changing the $m_{th}$ line in the character input box (m is an integer equal to greater than 1), the key control unit changes the initial value of the character type of the first character available to input in the $(m+1)_{th}$ line in the character input box to a character type of the input confirmed first character in the $m_{th}$ line in the character input box.

10. The electronic device according to claim 9,
    wherein, after changing the $m_{th}$ line in the character input box, the key control unit changes the initial value of the character type of the second character available to input in the $(m+1)_{th}$ line in the character input box to a character type of the input confirmed second character in the $m_{th}$ line in the character input box.

11. A non-volatile, non-transitory storage medium that stores a computer-readable program, the program causing an electronic device including a plurality of keys to execute:
    an input function of assigning characters of one or more character types to the plurality of keys respectively, and switching the character type of the characters available to input using the toggle input method in which the characters of one or more character types available to input are switched for every time the keys are operated;
    a control function of changing an initial value of the character type of an $n_{th}$ character available to input to the character type of the character that is input when the key or another key of the plurality of keys is pressed on the position of an $n_{th}$ character (n is an integer equal to or greater than 2)), even if the initial value is different from an initial default value assigned to the key; and
    a display function of displaying the input confirmed character and the character available to input on a display.

12. An electronic device comprising:
a first key which is assigned a character types $A_1$ and $B_1$;
a second key which is assigned character types $A_2$ and $B_2$; and
a key control unit which receives an input of a character based upon pressing of the first key and the second key, wherein:
  the key control unit receives an input of $A_1$ based on the user pressing the first key one time;
  the key control unit receives an input of $B_1$ based on the user pressing the first key i times, where i is an integer greater than 1;
  the key control unit receives an input of $A_2$ based on the user pressing the second key one time;
  the key control unit receives an input of $B_2$ based on the user pressing the second key j times, where j is an integer greater than 1; and
  the key control unit receives an input of $B_2$ after an input of $B_1$ based on the user pressing the second key one time after the user presses the first key i times.

* * * * *